United States Patent

[11] 3,621,233

[72] Inventor Harry Ferdinand, Jr.
2635 Karen Court Apt. 442, Las Vegas, Nev. 89109
[21] Appl. No. 784,502
[22] Filed Nov. 8, 1968
[45] Patented Nov. 16, 1971

[54] REMOVABLY ATTACHED VEHICULAR HEADLAMP GLARE-DIFFUSING FILTER
5 Claims, 4 Drawing Figs.

[52] U.S. Cl....................................... 240/46.59, 240/46.57
[51] Int. Cl....................................... F21v 9/08
[50] Field of Search........................... 240/46.57, 46.59

[56] References Cited
UNITED STATES PATENTS

| | | | |
|---|---|---|---|
| 1,196,760 | 9/1916 | Clark | 240/46.59 |
| 1,573,835 | 2/1926 | Horsey | 240/46.59 |
| 1,973,361 | 9/1934 | Smally | 240/46.59 |
| 2,297,168 | 9/1942 | Rosenberg | 240/46.59 |
| 3,191,025 | 6/1965 | Harker | 240/46.59 X |
| 3,283,143 | 11/1966 | Gosnell | 240/46.57 |

Primary Examiner—Samuel S. Matthews
Assistant Examiner—Richard M. Sheer
Attorney—Jerry R. Seiler ABSTRACT: A removably attached vehicular headlamp glare-diffusing filter comprises a flat and generally circular piece of light-diffusing moistureproof material having an outer peripheral edge and a notch extending from the outer peripheral edge to the approximate center of the piece forming two substantially straight edges which converge at the approximate center, a plurality of spaced peripheral cutouts and a moistureproof adhesive along the outer peripheral edge of the piece and long one edge of the notch. When applied to a headlamp lens, the filters form a shallow cone-shaped configuration, readily adaptable to the concave face of any vehicular headlamp.

PATENTED NOV 16 1971

3,621,233

INVENTOR
HARRY FERDINAND JR.
BY

REMOVABLY ATTACHED VEHICULAR HEADLAMP GLARE-DIFFUSING FILTER

This invention relates generally to an original construction design of a glare diffusion filter for vehicular headlamps and more specifically to an improved removably attached filter design to be adaptable to headlamps of all types of road vehicles, such automobiles, trucks and the like.

Headlamp glare diffusing filters of accepted standard have been previously designed as complete auxiliary self-contained light units which must be permanently installed on vehicles. These self-contained light units are expensive and costly to install, and in some cases not easily adaptable to all types of vehicles without additional costs for special adapters and the like.

The object of this invention is to provide an inexpensive and antiglare light diffusion lens filter which is adaptable to any standard vehicular lens and is both easily applied and removed as needed according to existing emergency weather conditions, such as smog, dust and generally bad weather conditions.

Another object of this invention is to provide a headlamp light diffusion filter which can readily be purchased at filling stations or automobile accessory stores in cases of emergency weather conditions and to provide a filter which can be easily and immediately applied to headlamps in order to alleviate the glare created by vehicular headlamps in weather conditions such as smog, dust and the like.

Another object of this invention is to provide a design so simple and adaptable that various economical translucent light diffusion materials can be used, such as heavy paper, which is basically ridged material in that it does not stretch to conform to irregular or concave surfaces such as is the case with a vehicular headlamp lens. The design shape allows the filter material to take the shape of a shallow cone allowing the concave face of a headlamp lens to fit into the recesses of the cone and allowing the peripheral edge of the cone to make contact with the periphery of the headlamp to create a peripheral seal and bond.

A further object of this invention is not only to shape the filter material into an adaptable cone so that it can readily be applied over the concave surface of a vehicular headlamp, but also to provide a means for the cone-shaped filter to retain its shape and to remain in place once it has been installed over the headlamp lens. This is done by providing a waterproof adhesive around the entire periphery and up one side of the cutout notch. This is done so that all edges are sealed to make a strong unit construction sealed tightly to the headlamp so that the on-rushing air cannot get underneath the filter and tear it from the headlamp lens as the vehicle moves forward.

Another object of this invention is to provide a design which can be readily adaptable to various translucent filter materials, both ridged and otherwise, which can be manufactured with the simplest of tooling. Special tooling is not required to form the filter material into special shapes with special dies, thus increasing the cost of the product and making it more expensive and thus less desirable to purchase as an expendable item.

Still another object of this invention is to provide a translucent material for the filter design which is economical and impervious to moisture and wind, such as moisture treated heavy translucent paper. Other materials are suitable to act as light diffusion filters which meet all the above necessary requirements.

Still another object of this invention is to provide peripheral cutouts for protruding nipples that are prevalent at three specific locations on the outside face of all modern date vehicular headlamp lens. This is necessary so that all edges are sealed tightly against the concave face of the lens in order that wind cannot get underneath the filter material and tear it from the lens.

Other objects, features and advantages of this invention will be apparent from the following detailed description, which is accompanied by the drawing, which is:

Figure 1:
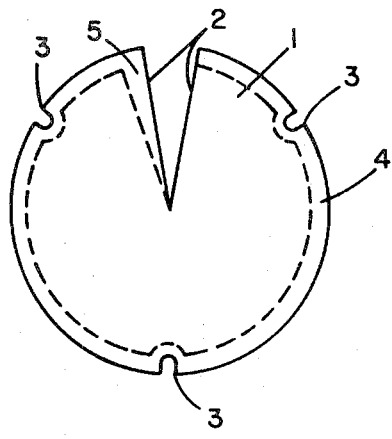
FIG. 1 is a plan view of the filter as it is laid out flat.
Figure 2:
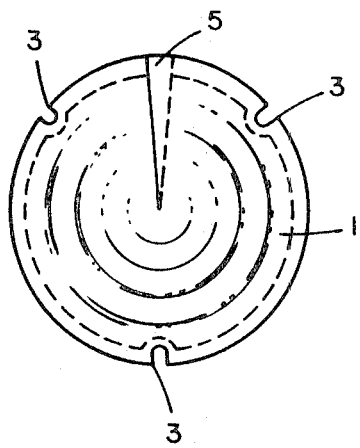
FIG. 2 is a plan view of the filter after being shaped into a cone.
Figure 3:
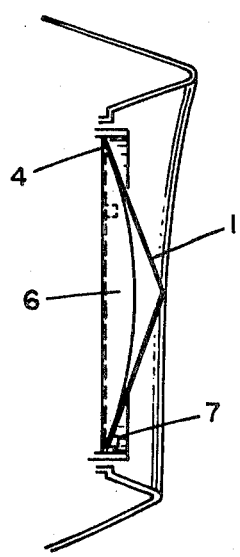
FIG. 3 is a cross-sectional view showing the cone shape installed on a headlamp lens.
Figure 4:
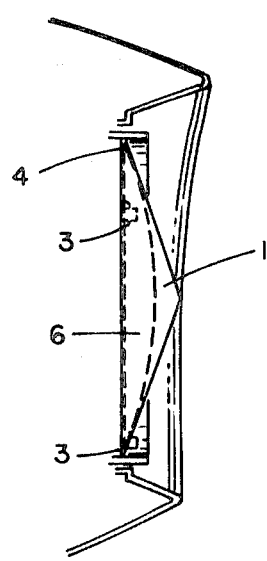
FIG. 4 shows a side view of the filter as it has been applied to the headlamp lens.

Referring to FIGS. 1 through 4, there is shown a filter indicated by number 1. Filter 1 is a flat translucent piece of light-diffusing materials such as heavy paper, plastic or other material suitably impregnated, if necessary, so as to render it moistureproof and impervious to rain and wind. A notch 2, is provided from the outside periphery of the filter to the center. Three peripheral cutouts 3, are provided at specific places in order to provide clearance for nipples 7, on modern day vehicular headlamp lens. A weatherproof adhesive 4, is provided around the outside periphery and down one side 5, of the notch 2, in Filter 1. FIG. 2 No. 5 shows the Filter 1, assembled in a cone shape and held in place by adhesive 4, provided on one side of the notch 2, as shown in FIG. 1 so that it can be properly adapted to a vehicular headlamp lens 6. The Filter 1, is placed on headlamp lens 6, FIG. 3, and seals and bonds tights to periphery of headlamp lens 6 with adhesive 4 provided around periphery of Filter. Notches 3, provided in three places in periphery of Filter 1, to clear nipples 7, protruding from the face of a modern day vehicular lens 6, so as to allow all edges of said filter to adhere tightly to the face of headlamp lens 6. This is done in order that on-rushing air cannot work its way underneath the Filter 1, to tear it loose from the face of the headlamp lens 6.

I Claim:

1. A glass-diffusing vehicular headlamp filter comprising a substantially flat and generally circular piece of light-diffusing material having an outer peripheral edge and a notch extending from the outer peripheral edge to the approximate center of said piece forming two substantially straight edges which converge at said approximate center, a plurality of spaced peripheral cutouts and a moistureproof adhesive along the outer peripheral edge of said piece and along one edge of said notch, whereby said piece is formed into a shallow cone shape filter when said edges of said notch are overlapped.

2. The filter of claim 1 wherein said peripheral cutouts are spaced along the outer peripheral edge of said piece so as to conform to spacing of nipples of a vehicular headlamp.

3. The filter of claim 1 herein said notch edges are overlapped and bonded by said adhesive along said one edge of said notch.

4. The filter of claim 1 wherein said material comprises heavy moistureproof light-diffusing paper.

5. The filter of claim 1 herein said material comprises light-diffusing plastic.